I. H. PALMER.
Band Cutter and Feeder for Thrashers.
No. 41,390. Patented Jan. 26, 1864.
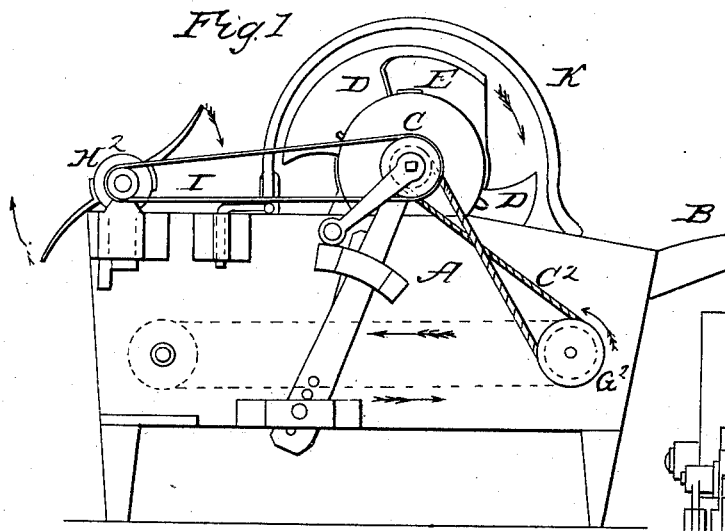
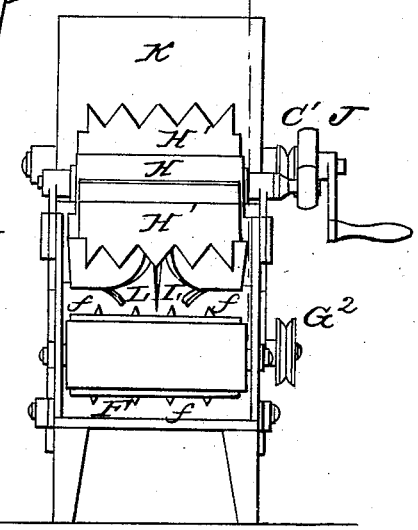
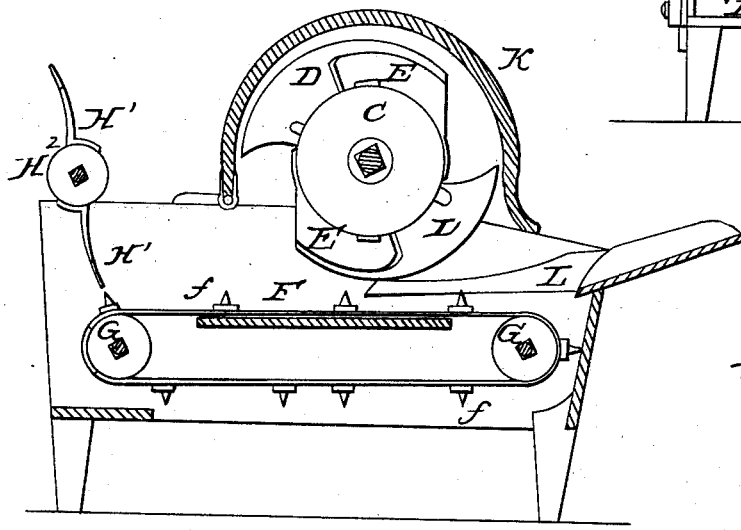
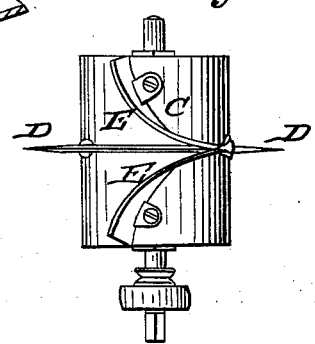

UNITED STATES PATENT OFFICE.

ISAAC H. PALMER, OF LODI, WISCONSIN.

IMPROVEMENT IN BAND-CUTTING AND FEEDING ATTACHMENTS TO THRASHERS.

Specification forming part of Letters Patent No. 41,390, dated January 26, 1864.

*To all whom it may concern:*

Be it known that I, ISAAC H. PALMER, of Lodi, in the county of Columbia and State of Wisconsin, have invented a certain new and Improved Band-Cutter and Feeder for Thrashing-Machines; and I do hereby declare the following to be a full and exact description of the same, reference being had to the accompanying drawings, making part of this specification, in which—

Figure 1 is a side elevation of my invention. Fig. 2 is a rear elevation thereof. Fig. 3 is a vertical longitudinal section of the same; and Fig. 4 is a plan or top view of the cylinder, hereinafter described.

The object of this invention is to automatically sever the bands of sheaves of grain in the act of feeding the said sheaves to the thrashing-machine, and separate or spread the same, to render the thrashing operation more effectual.

The invention consists in a novel arrangement of revolving knives and separators, operating in combination with a feeder or apron, all mounted within or upon a box, trough, or frame communicating with the mouth or hopper of a thrashing-machine, and driven by a suitable connection with the thrashing-machine or by other suitable means.

In order that others skilled in the art to which my invention appertains may be enabled to fully understand and use the same, I will proceed to describe its construction and operation.

In the accompanying drawings, A may represent an oblong box or trough provided at one end with an inclined scoop-shaped feed-board, B. The opposite end of this box is designed to communicate with the hopper or mouth of a thrashing-machine.

C is a cylinder mounted transversely upon the box A, and rotated by any suitable connection with the thrashing-machine or prime motor.

D D are segmental knives or blades, secured upon opposite sides of the revolving cylinder C, about equidistant from the ends thereof, and adapted to sever the bands of the sheaves as they pass under said cylinder.

E E E E represent wings, which are also secured upon the cylinder C, and attached in pairs at their respective inner ends to one end of the blades D, their other ends being deflected outward or toward the ends of the cylinder C, in order to spread or distribute the grain equally in a transverse direction upon the endless belt or apron F when the machine is in operation. This apron F is located at a suitable distance beneath the cylinder C, and supported upon and operated by shafts G G', to the latter of which is secured a pulley, $G^2$, to which motion may be imparted by a band, $C^2$, from the pulley C'. The carrying-apron F is provided with transverse ranges of teeth $f$, to insure the uninterrupted conveyance of the grain.

H is a shaft, on the opposite sides of which are secured toothed beaters H' H'. The said shaft is journaled upon the end of the box A which communicates with the thrashing-machine, and is revolved with great velocity through the medium of a small pulley, $H^2$, over which a band, I, passes from the pulley J. The use of the beaters H' H' is to thin out the grain just previous to passing into the thrashing-machine, causing it to enter continuously and uniformly, whereby the thrashing operation will be much more thorough and effectual than if the grain were permitted to enter the thrashing-machine in heavy masses.

K may represent a hood or canopy for retaining the grain within the box A while the machine is in operation.

L L are arms for guiding the sheaves in proper position to the knives D D.

Operation: The machine being set in motion by any suitable power, the sheaves are successively placed endwise upon the feed-board B, down which they slide onto the apron F, which moves in the direction indicated by the arrows. As each sheaf passes beneath the cylinder C, one of the knives D will sever its band, and the wings E E will penetrate the sheaf and traverse its entire length, whereby it is spread equally from side to side of the box A. Having passed the cylinder C, the grain is carried along by the apron until it arrives beneath the beaters H' H', when it is by the latter thinned out and supplied to the thrashing-machine in a continuous uniform quantity, which will be readily and thoroughly thrashed.

From the above description it will be seen that by my invention scarcely any manual labor is required to accomplish that which has hitherto been attended with great difficulty, it being only necessary to deposit the sheaves upon the feed-board B, when they are automatically converted into loose gavels and supplied to the thrashing apparatus.

Having thus described my invention, what I claim as new, and desire to secure by Letters Patent, is—

A band-cutter and feeder for thrashing-machines, constructed and operating substantially as herein described.

ISAAC H. PALMER.

Witnesses:
   CHARLES SMITH,
   OCTAVUS KNIGHT.